United States Patent
Saito et al.

[11] Patent Number: 5,445,203
[45] Date of Patent: Aug. 29, 1995

[54] RADIAL TIRE WITH EVEN WEAR AT TREAD SHOULDERS

[75] Inventors: Kenji Saito, Frankfurt am Main, Germany; Akira Kajikawa, Kobe, Japan; Akihiro Nakatani, Kakogawa, Japan; Atsushi Yamahira, Nishinomiya, Japan; Hiroyuki Noma, Kobe, Japan; Kazuhiko Kawamura, Akashi, Japan

[73] Assignee: Sumitomo Rubber Industries Ltd., Kobe, Japan

[21] Appl. No.: 802,518

[22] Filed: Dec. 5, 1991

[30] Foreign Application Priority Data

Dec. 10, 1990 [JP] Japan ................. 2-410002
Dec. 10, 1990 [JP] Japan ................. 2-410003
Dec. 28, 1990 [JP] Japan ................. 2-415640

[51] Int. Cl.⁶ .............. B60C 9/18; B60C 9/20; B60C 9/28
[52] U.S. Cl. .............. 152/527; 152/526; 152/531; 152/535; 152/538
[58] Field of Search .............. 152/526, 527, 535, 538, 152/531; 454/454

[56] References Cited

U.S. PATENT DOCUMENTS 5,131,446  7/1992  Fukumoto et al. .

FOREIGN PATENT DOCUMENTS

| 0237462 | 2/1987 | European Pat. Off. . |
| 0323519 | 7/1989 | European Pat. Off. . |
| 2647716 | 12/1990 | France . |
| 58-170602 | 10/1983 | Japan . |
| 2037677 | 7/1980 | United Kingdom . |
| 2134574 | 7/1984 | United Kingdom . |
| 2198996 | 6/1988 | United Kingdom ................ 152/538 |

*Primary Examiner*—Adrienne C. Johnstone

[57] ABSTRACT

A belted radial ply tire which comprises a bead core disposed in each bead portion, a carcass extending between the bead portions and turned up around the bead cores, and a belt comprising at least two cross plies disposed radially outside the carcass and inside the tread, and in a state that the tire is mounted on its regular rim and inflated to its regular inner pressure but loaded with no tire load, the effective belt width BW of the effective belt part BE of the belt, the belt edge camber height CH of the belt, and the tire section width TW satisfy $2.50(BW/TW) - 1.25 < CH < 13.3(BW/TW) - 4.65$.

12 Claims, 6 Drawing Sheets

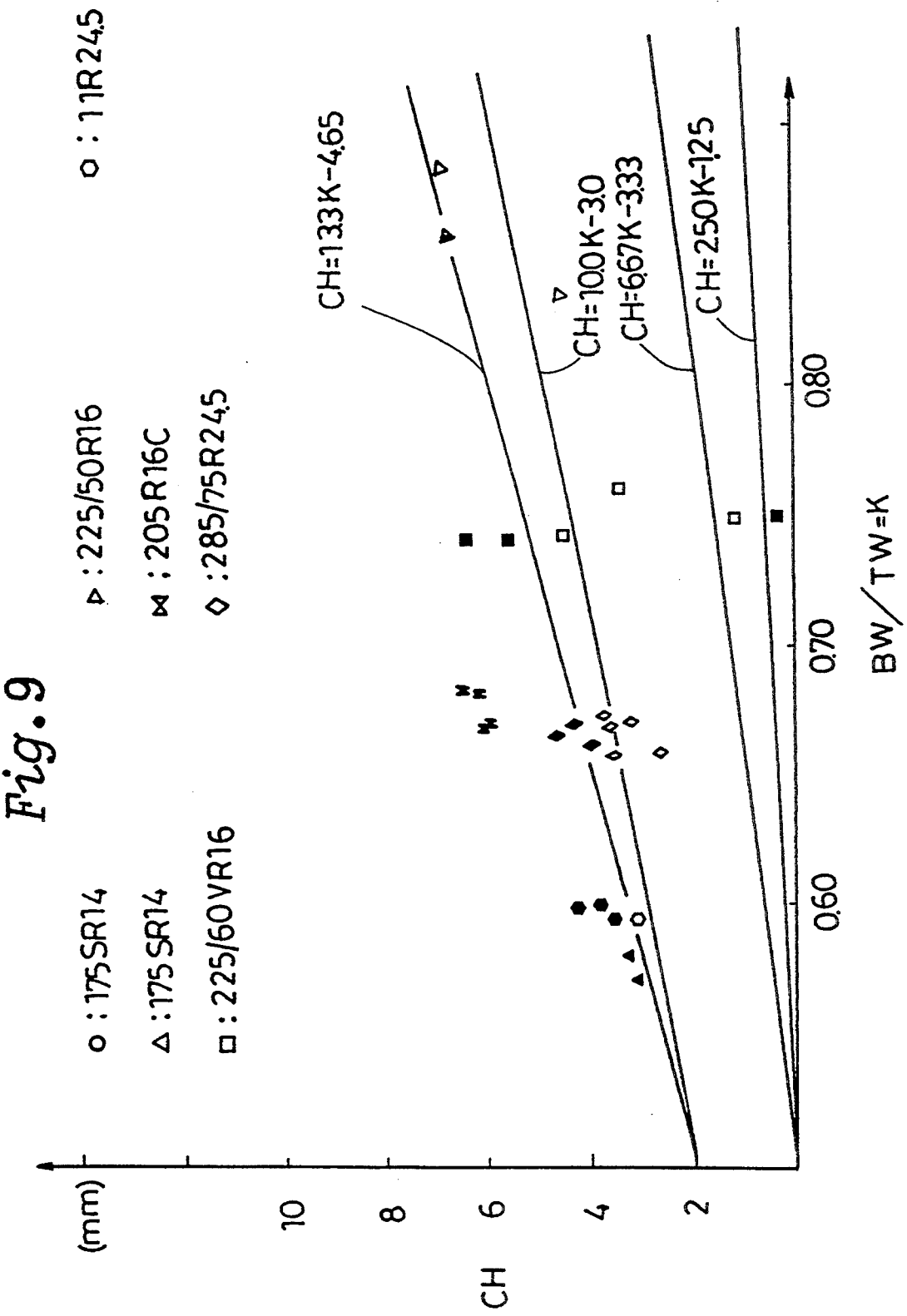

RADIAL TIRE WITH EVEN WEAR AT TREAD SHOULDERS

The present invention relates to a pneumatic radial ply tire in which uneven wear at tread shoulders is effectively reduced, and is suitably applied to passenger tires, truck/bus tires, light truck tires and the like.

BACKGROUND OF THE INVENTION

In the belted radial ply tires, especially which has a stiff belt, e.g. steel belt, the ground pressure distribution is liable to become uneven, and uneven wear is liable to be caused between the tread crown and tread shoulders. In general, the amount of wear in the tread shoulders is larger than that of the tread crown.

Such uneven wear between the tread crown and tread shoulders is considered to be caused by the curved tread profile. That is, the tread has a difference in diameter between the tread crown and tread shoulders, and this causes a slip against the ground so that the tread shoulders are worn earlier than the crown.

In order to reduce such unevenwear, for example, to increase the radius of curvature of the tread profile, to increase the size of blocks in the tread shoulders to increase the rigidity thereof, and to increase the rigidity of the belt particularly in the tread shoulder regions have been proposed, but cannot solve the problem satisfactorily.

Further, an excessive increase in the shoulder block rigidity or the belt rigidity is liable to cause other problems, namely to increase tire noise and to deteriorate ride comfort.

SUMMARY OF THE INVENTION

It is therefore, an object of the present invention to provide a radial ply tire, in which, by improving the ground pressure distribution, the tread shoulders are effectively prevented from uneven wear.

In the present invention, various sizes and profiles in the tire are defined as being in a normally inflated but unloaded state that the tire is mounted on its regular rim and inflated to its regular inner pressure and loaded with no tire load.

The regular rim is the rim officially approved for the tire by, for example JATMA (Japan), TRA (USA), ETRTO (Europe) and the like.

The regular inner pressure is the maximum air pressure for the tire officially specified in Air pressure/Max. loads Table by the above-mentioned associations.

Tire section width TW is the maximum cross section width of the tire measured excluding decorative patterns and letters, if any.

Effective belt part BE is such a part of a belt where at least two belt plies are overlapped each other so that the cord directions thereof cross each other, that is, the cords in the ply cross the cords in the other ply.

Effective belt width BW is the maximum width of the effective belt part BE measured between the axially outermost edges (A) thereof.

Accordingly, when the belt is composed of two cross plies, the effective belt width BW is the width of the not wider ply or the narrower ply. When the belt is composed of three or more plies, the effective belt width BW is the width of the second widest belt ply.

Belt edge camber height CH is the radial distance between two points A and B on the thickness center curve L of the two belt plies which define the above-mentioned effective belt part BE, more particularly a center curve drawn between the cords in the radially outer belt ply and the cords of the radially inner belt ply. Specifically, the belt edge camber height CH is the radial distance which exists on each side of the tire equator between each corresponding pair of points A and B.

A point A is located at each of the above-mentioned outermost edges A of the effective belt part BE.

A point B is located axially inward of the corresponding point A by an axial distance of 0.2 times the effective belt width BW. In other words, each point B is at an axial distance of 0.3 times BW from the tire equator.

Hereinafter, the 0.2 BW width part and the in-between part are respectively referred as "lateral part OP" and "central part IP" of the belt, and the thickness center curve L is defined as the "belt profile".

Belt edge camber area SA is, as shown in FIG. 7, an area surrounded by curve A-B, line A-D and curve B-D.

Based on that the central part IP is formed by a single radius of curvature and the lateral parts OP are cambered towards the tire sidewall portions, the curve B-D is an extension of the curve B-C, that is, a part of the single radius are C-B-D.

The line A-D is a straight line drawn radially outwardly from the point A in parallel with the tire equator CO.

The curve A-B is the above-mentioned lateral part OP of the thickness center curve L.

Incidentally, the above-mentioned sizes and profiles can be measured with a CT scanner.

According to one aspect of the present invention, a radial ply tire comprises a bead core disposed in each bead portion, a radial or semi-radial carcass extending between the bead portions and turned up around the bead cores, and a belt comprising at least two cross plies disposed radially outside the carcass and inside the tread, the belt having edge portions curved toward sidewall portions, in a state that the tire is mounted on its regular rim and inflated to its regular inner pressure but loaded with no tire load, the effective belt width BW (mm) of the effective belt part BE of the belt, the belt edge camber height CH (mm) of the belt, and the tire section width TW (mm) satisfy the following equation 1:

$$2.50(BW/TW)-1.25 < CH < 13.3(BW/TW)-4.65 \qquad \text{Eq.1.}$$

This is based on the following facts found from the results of various tests conducted by the inventors.

First, the amount of uneven wear in the tread shoulder has a correlation with the radius of curvature of the belt profile in the tread shoulder, and further it closely relates to the effective belt part BE of the belt.

Second, the lateral part OP of the belt affects uneven wear, and the curvature of the lateral part OP or the belt edge camber height CH closely relates to the amount of uneven wear.

Third, when the above-mentioned belt edge camber height CH (mm) satisfies the following equation 2, uneven wear is prevented:

$$CH < 13.3(BW/TW)-4.65 \qquad \text{Eq.2}$$

where
BW: effective belt width in mm
TW: tire section width in mm

This is based on the results of tests shown in FIG. 9, in which tests, changing the tire size, aspect ratio and the number of belt plies, the values of the belt edge camber height CH and the quotient BW/TW are changed.

In FIG. 6, the shape of the plotting mark indicates the size of the tire, and if the mark is printed black, it means that uneven wear was caused.

As apparent from FIG. 9, the condition by which uneven wear is prevented is defined as the above-mentioned equation 2 by only the relation between the quotient BW/TW and the belt edge camber height CH, regardless of the tire size, aspect ratio and belt ply number.

By setting the belt edge camber height CH to be not more than the value of 13.3(BW/TW)−4.65, the belt easily becomes flat when in the ground contacting patch as shown by a chain line BL in FIG. 8 (broken line: nondeformed belt profile L), and further the difference in the amount of radial deformation of the belt between the tread crown and tread shoulders is decreased. As a result, the ground pressure distribution is uniformed, and the slip between the tread shoulders and the ground is reduced, and thereby the above-mentioned uneven wear is prevented.

More preferably, the belt edge camber height CH is set to satisfy the following equation 3:

$$CH < 10.0(BW/TW) - 3.0 \quad \text{Eq.3}$$

Fourth, when the belt edge camber height CH is however, excessively small, the ground pressure at the tread shoulders increases, and the wear of the tread shoulders, especially during cornering increases.

Accordingly, a lower limit is given to the belt edge camber height CH as follows:

$$CH > 2.50(BW/TW) - 1.25 \quad \text{Eq.4}$$

More preferably, $$CH > 6.67(BW/TW) - 3.33 \quad \text{Eq.5}$$

From the equations 2 and 4, the range for the belt edge camber height CH is $$2.50(BW/TW) - 1.25 < CH < 13.3(BW/TW) - 4.65 \quad \text{Eq.1}$$

In relation to the equation 2, if the effective belt width BW is substantially the same as the width of the ground contacting area, the quotient BW/TW has a tendency to increase as the tire aspect ratio decreases. Accordingly, in a low aspect ratio tire, the effective belt width BW becomes relatively large, therefore, a relatively large value is used for the belt edge camber height CH.

Preferably, the radial tire is further provided with a belt profile such that an arc passing through three points B, C and B on the above-mentioned thickness center curve L has its center on the equatorial plane of the tire, and the radius CR1 of the arc is more than 1.4 times the tire section width TW, where the points B are the above-mentioned axially inner points B spaced apart a distance of 0.3 BW from the tire equatorial plane, and the point C is a point of intersection between the equatorial plane and the thickness center curve L.

This can control an increase in the ground pressure in the tread crown region, and can even the ground pressure distribution. However, if the radius CR1 is too large, the ground pressure is liable to be increased at the tread shoulders by the flattened tread crown region.

By setting the radius CR1 in the range of not more than 15 times, more preferably not more than 10 times the tire section width TW, such a ground pressure increase is prevented.

The belt profile or the thickness center curve L comprises the central part IP and the two lateral parts OP as mentioned above.

The central part IP is formed by a single radius of curvature of the above-mentioned radius CR1, and each of the lateral parts OP is formed by a curve, and those parts IP and OP are smoothly connected each other at the points B so as not to form an inflection point. The lateral part OP can have either a multi-radius curvature, or a single radius, curvature, CRm/s which radius is smaller than CR1. Such multi-radius or single radius curvature is shown as CRm/s in FIGS. 1, 6, and 7.

BRIEF DESCRIPTION OF THE DRAWINGS

An embodiment of the present invention will now be described in detail in conjunction with the accompanying drawings, in which:

FIG. 9 is a graph showing the relationship between CH and BW/TW; and

DETAILED DESCRIPTION OF THE INVENTION

Figure 1:
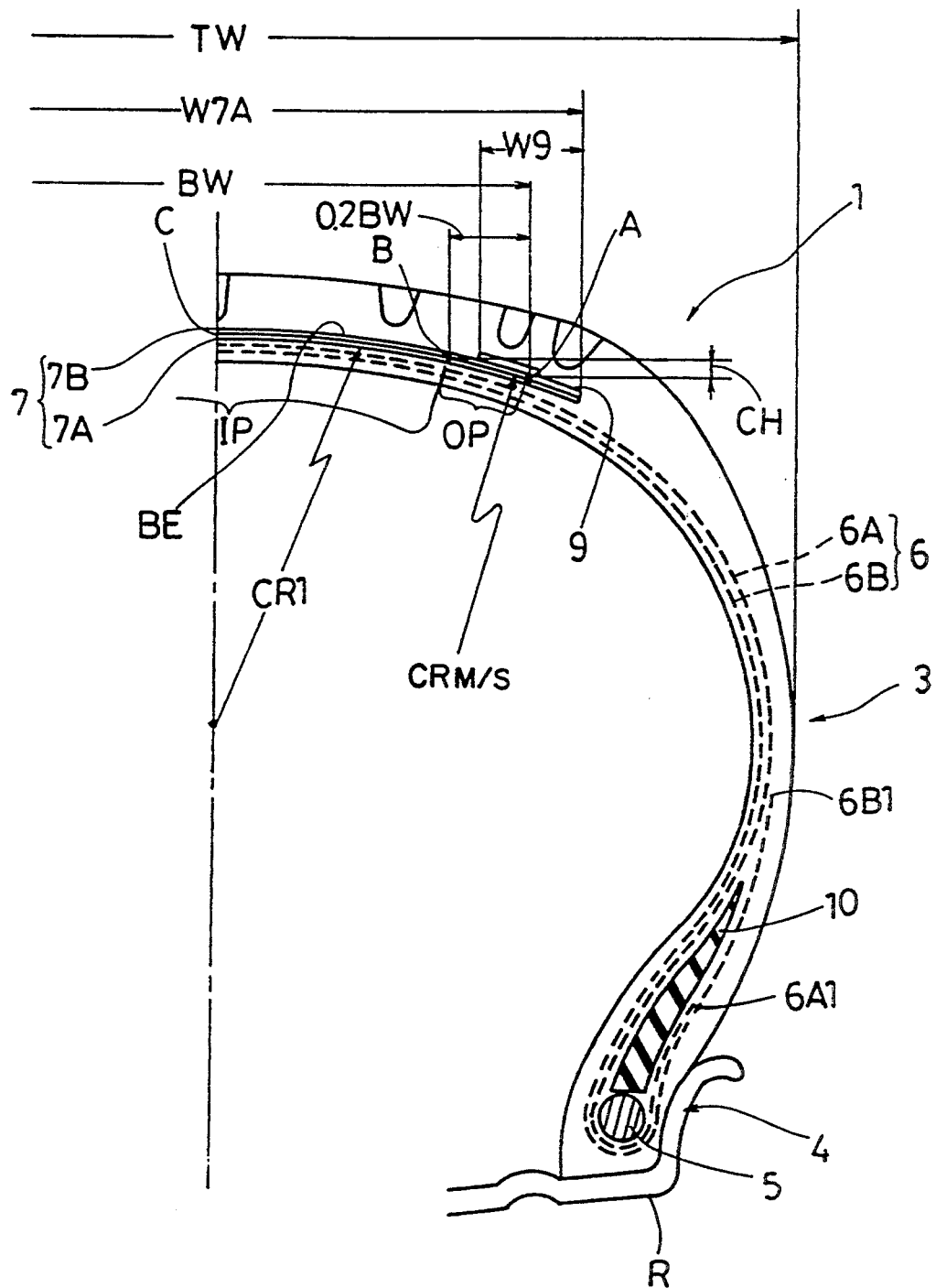
FIG. 1 is a cross sectional view of a radial tire of the present invention.

In FIG. 1, the tire 1 is mounted on its regular rim R and inflated to its regular inner pressure, but loaded with no load, that is, the normally inflated but unloaded state of the tire 1 is shown.

The tire 1 has a tread portion 2, a pair of axially spaced bead portions 4, and a pair of sidewall portions 3 extending between the tread edges and the bead portions.

The tire 1 comprises
 a bead core 5 disposed in each bead portion 4,
 a carcass 6 extending between the bead portions 4 and turned up around the bead cores 5 to be secured thereto,
 a belt disposed radially outside the carcass 6, and
 a bead apex 10 made of hard rubber with a JIS-A hardness of 70 to 90 disposed between the main portion and each turned up portion of the carcass and extending taperingly radially outwardly from the bead core 5.

The carcass 6 in this embodiment is composed of two plies 6A and 6B turned up around the bead cores 5 from the axially inside to outside thereof.

The radially outer edge of the axially inner carcass ply turned up portion 6A1 is terminated radially outward of the radially outer edge of the bead core 5.

The radially outer edge of the axially outer carcass ply turned up portion 6B1 extends over the radially outer edge of the axially inner carcass ply turned up portion 6A1, and it is terminated near the maximum tire section width point.

The cords in each carcass ply are arranged radially at an angle of 60 to 90 degrees with respect to the tire equator CO so as to provide a radial or semi-radial structure.

For the carcass cords, steel cords and organic fiber cords, e.g. nylon, rayon, polyester and the like can be used.

The belt in this embodiment includes a breaker belt 7 and a band belt 9 disposed radially outside the breaker belt 7.

The breaker belt 7 comprises two plies 7A and 7B. The width W7A of the radially inner ply 7A is larger than the width of the ground contacting area, and the width W7B of the radially outer ply 7B is substantially equal to the width of the ground contacting area.

The width W7A of the radially inner ply 7A is set to be 1.01 to 1.20 times the width W7B of the radially outer ply 7B. It is preferable that the effective belt part BE is located within the the ground contacting region. If this part BE is protruded, the ride comfort is deteriorated, and belt edge separation failure is liable to occur.

In the above-mentioned breaker belt plies 7A and 7B, steel cords are used as the belt cords.

The cords in each breaker belt ply are laid parallel with each other at an angle of about 10 to 30 degrees with respect to the tire equator so that the cords in the inner ply cross the cords in the outer ply.

The edge portions of the radially innermost belt ply 7A are space apart from the carcass, and the distance therebetween increases toward the edge. In the resultant wedge-shaped space, a rubber cushion (not shown) is disposed.

Figure 2:
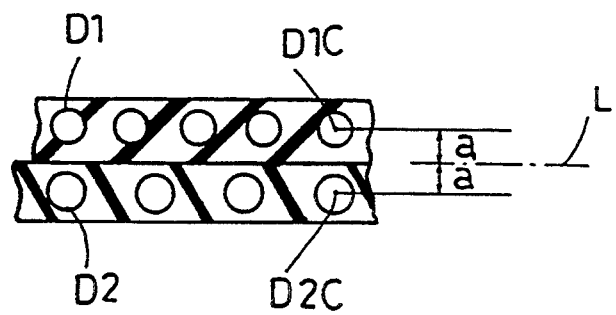
FIG. 2 is a cross sectional view of the belt explaining the thickness center curve thereof.

Therefore, in this embodiment, as the radially outer belt ply 7B is narrower than the inner belt ply 7A, the above-mentioned effective part BE is formed between the axial edges of the outer ply 7B. The effective belt width BW is the width of the outer belt ply 7B. The thickness center curve L or belt profile is a curve drawn radially equidistantly from the centers D1C of the cords D1 in the belt ply 7B and the centers D2C of the cords D2 in the belt ply 7A, as shown in FIG. 2.

Figure 3:
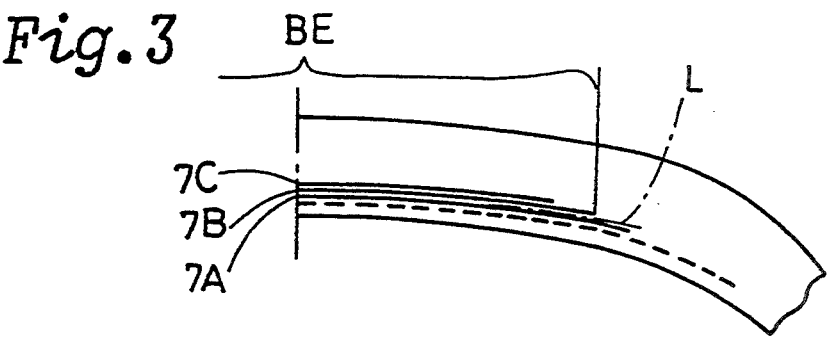
FIGS. 3 and 4 are cross sectional views of three-ply belts.
Figure 4:
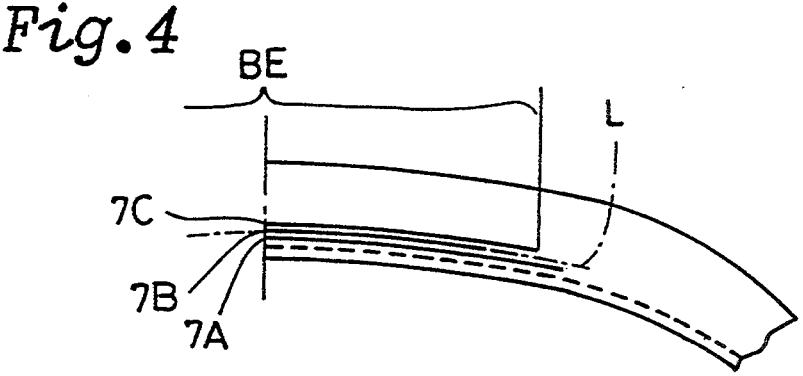

Incidentally, in such a case that an additional breaker belt ply 7C of parallel cords laid at an angle of about 10 to 30 degrees with respect to the tire equator is disposed on the radially outside of the above-mentioned breaker belt plies 7A and 7B, as shown in FIGS. 3 and 4, if the ply 7C is narrowest as shown in FIG. 3, then the effective belt width BE is of the ply 7B, and the belt profile L is between the plies 7A and 7B.

If the ply 7C has the second widest width as shown in FIG. 4 and the cord direction thereof is crosswise to that of the widest ply 7A, then the effective belt width BE is of the ply 7C, and the belt profile L is defined between the plies 7C and 7A.

In this embodiment, as mentioned above, the band belt 9 has cords laid in substantially parallel with the tire equator CO at a small angle of 0 to 10 degrees, preferably 0 to 5 degrees with respect to the tire equator, and it is formed by winding one or more rubber coated cords or by winding a strip of rubber coated parallel cords. The main difference between the breaker belt and band belt is the cord angle.

The band belt 9 in this example is composed of axially spaced edge belt plies. The edge belt ply is disposed on the edge of the breaker belt 7 and extends axially so as to cover the edge of the inner belt ply 7A and the edge of the outer belt ply 7B. The width W9 thereof is 15 to 40% of the width W7A of the belt ply 7A.

For the band cords, organic fiber cords having a relatively large extensibility such as nylon, polyester, rayon and the like are used, whereby the band belt can follow up the deformation of the breaker belt 7 thereby providing a tight and stable hooping force on the breaker belt 7, and the separation from the breaker belt 7 is prevented.

This arrangement of the band belt 9 can reduce the rigidity difference around the breaker belt edge portion and evens the ground pressure distribution. Therefore, uneven wear is prevented and high speed steering stability is improved.

Test tires of size 215/60R15-90H having the structure shown in FIG. 1 (but without the band belt 9) were prepared and tested for evenness of wear, wear during cornering, steering stability, and durability.

In the test tires, the carcass cord material was polyester, the carcass cord angle was 88 degrees to the tire equator, the number of the breaker belt plies was two, and the breaker belt cord was a 1×5/0.25 steel cord. The other specifications of the test tires and test results are given in Table 1.

In the wear evenness test, the state of the wear occurred after running for 3000 km under the regulated tire load was examined.

In the cornering wear test, the amount of shoulder wear was measured after making 500 turns of a radius of 50 m at a speed of 40 km/h.

In the steering stability test, the test tires were installed on a 3000 cc FR passenger car, and the steering stability during slalom running on a flat road at 80 km/h was evaluated by a test driver.

The durability test was the speed step-up test according to ECE30.

The test results in Table 1 are indicated by an index based on that the reference tire 1 is 100. The larger the index, the better the performance.

As seen from Table 1, the working example tires 1–3 were worn evenly In comparison with the reference tires 1–3.

Further, in this embodiment, in order to improve the adhesion of the steel breaker belt cord to its surrounding rubber, a steel cord having the following features is used.

Figure 5:
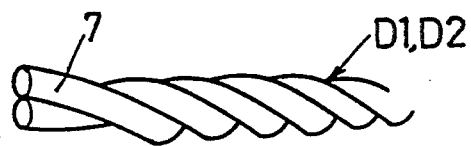
FIG. 5 is a perspective view of a belt cord.
Figure 8:
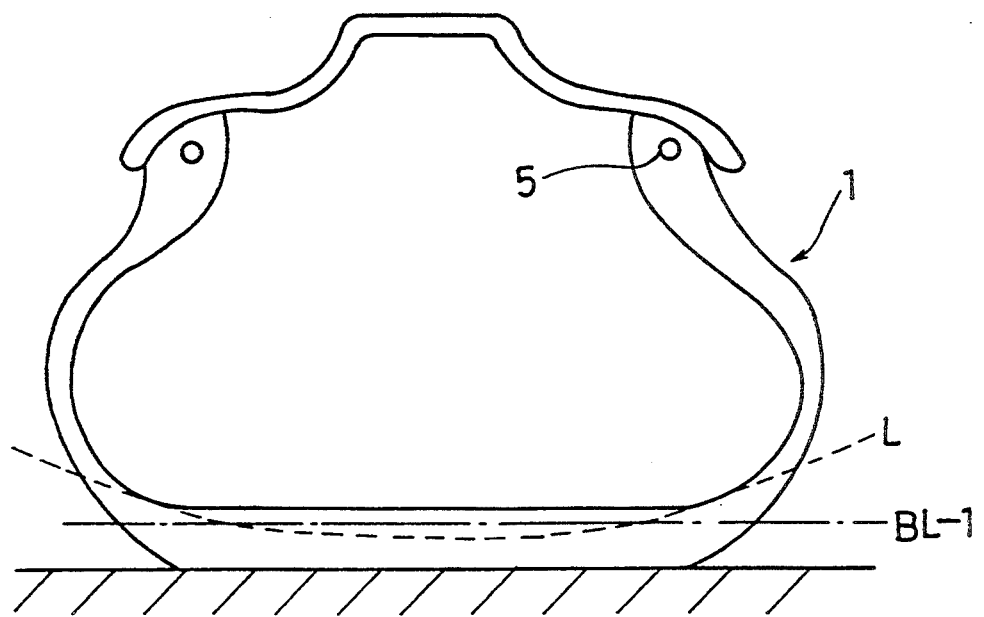
FIG. 8 is a schematic cross sectional view of the tire explaining the belt profile variation.

FIG. 5 shows the structure of the breaker belt cord D1, D2.

The cord is composed of two or three strands, in this example two strands, twisted together.

Each strand is a steel monofilament having a diameter of 0.25 to 0.32 mm.

The twist pitches of the strands are 8 to 15 mm.

Therefore, the rubber penetrates into the cord, and the adhesion therebetween can be improved.

When the diameter is less than 0.25 mm, the belt rigidity becomes low and required performance Is not obtained. When the diameter is more than 0.32 mm, the belt rigidity becomes excessively high and the ride comfort is deteriorated and the tire weight is unfavorably increased.

Such steel cords are embedded parallel each other in coating rubber to form the breaker belt ply. The cord count in each ply is set to be 39 to 60 ends/5 cm.
When the cord count is less than 39 ends/5 cm, the belt rigidity becomes insufficient to maintain or improve the tire performance. On the other hand, If the cord count is more than 60 ends/5 cm, the belt rigidity is excessively increased, and the ride comfort is deteriorated and further tire weight is unfavorably increased.

By the above-mentioned cord structure, the adhesion can be improved, but due to the looseness of the twist and the use of the monofilaments as strands, friction and rubbing between the strands are liable to occur.
Therefore, under severe service conditions, a breakage of the steel filament due to the friction and rubbing (hereinafter, called "BBU") is liable to occur.

In order to prevent BBU (breakage of the strand), the belt edge camber area SA ($mm^2$) and the effective belt width BW (mm) are set to satisfy the following equation 6.

$$0 \neq \leq SA/BW \neq \leq 0.1 \qquad \text{Eq.6}$$

Figure 6:
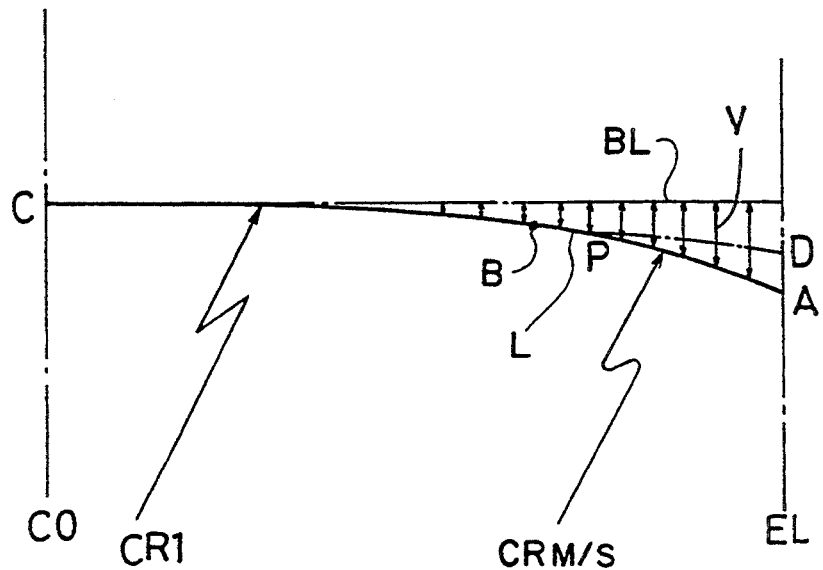
FIG. 6 is a diagram explaining a variation of the belt profile between the ground contact and uncontact states of the tire.

FIG. 6 show the amount (V) of deformation from the belt profile (L) of the uncontact state to the belt profile (BL) of the ground contacting state.
The amount (V) becomes larger toward the edge A, and the rate of this increase starts to increase at a point (P). The point (P) is the separating point of the belt profile L from the arc C-B-D of the single radius CR1, as shown In FIG. 7.

The above-mentioned BBU is liable to occur at this point (P).

Figure 7:
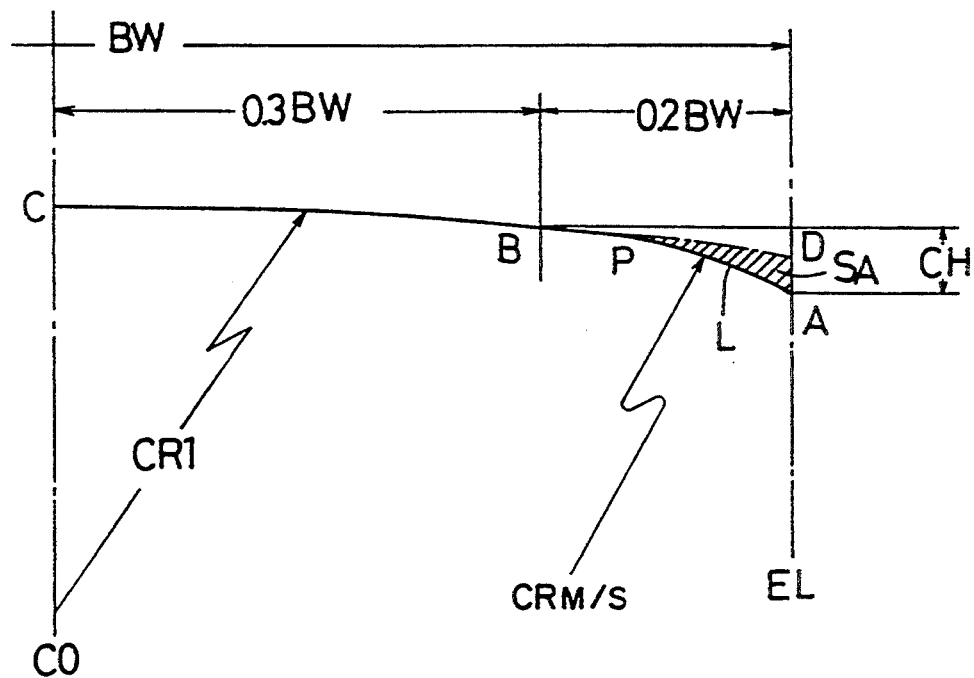
FIG. 7 is a diagram explaining the belt edge camber height CH and the belt edge camber area SA.

In FIG. 7, as the single radius arc whose radius is CR1, extends beyond the 0.3 BW point B, the separating point (P) is located rather axially outside of the point B.
In this case, therefore, the belt edge camber area SA is given by the hatched generally triangular area A-P-D.

Figure 10:
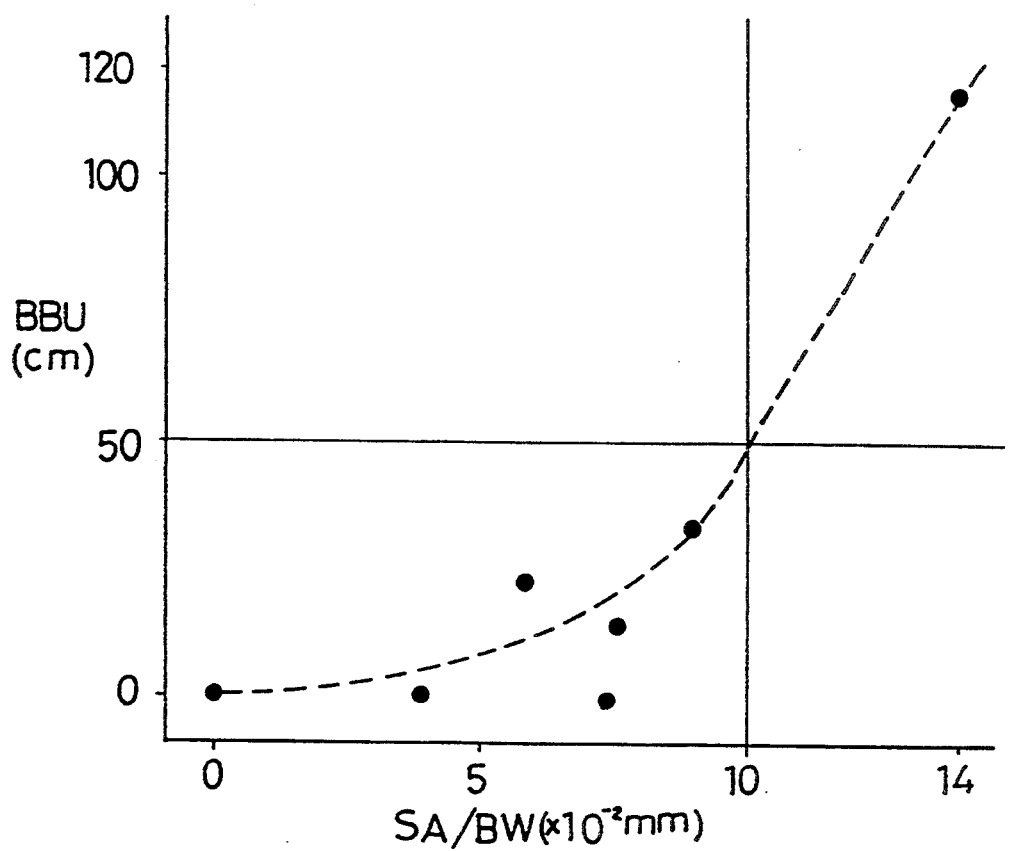
FIG. 10 is a graph showing the relationship between BBU and SA/BW.

Table 2 and FIG. 10 show the results of BBU resistance tests conducted by the inventors.

In the tests, each test tire was mounted on its regular rim and inflated to its regular inner air pressure, and using 1600–3000 cc passenger cars, the tire was subjected to 300 figure-eight-turns during running at a speed of 25 km/h in an eight-turn test course made up of two 7 m radius circular course, and then the tire was cut-open Inspected for BBU.

In Table 2, BBU are expressed by the total length of the broken parts around the tire circumference.

In the test tires, the cord structure of the breaker belt cord was 1×2, (two steel monofilaments twisted together), the diameter of the steel monofilament was 0.30 mm, and the cord count was 49 ends/5 cm.

It was known that If the BBU total length exceeds 50 cm in the test, in the actual use of such a tire, BBU occurs.

Therefore, as seen from FIG. 10, by setting the value of SA/BW in the range of greater than 0 to 0.1 mm, the occurrence of BBU can be effectively prevented.

Accordingly, the belt edge camber area SA and the effective belt width BW are set to satisfy the following equation 6 as mentioned above.

$$0 \neq \leq SA/BW \neq \leq 0.1 \qquad \text{Eq.6}$$

Incidentally, in the tires of the present invention, it is possible to dispose a reinforcing layer in each bead portion, for example between the carcass and the bead core and to dispose a rim chafer on the outermost side of the bead portion.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

| Tire | Ex. 1 | Ex. 2 | Ex. 3 | Ref. 1 | Ref. 2 | Ref. 3 |
| --- | --- | --- | --- | --- | --- | --- |
| Breaker belt angle (deg) | 24 | 24 | 21 | 24 | 24 | 19 |
| TW (mm) | 215 | 215 | 217 | 215 | 216 | 218 |
| BW (mm) | 163 | 160 | 102 | 159 | 160 | 164 |
| BW/TW | 0.76 | 0.74 | 0.745 | 0.74 | 0.74 | 0.75 |
| CH (mm) | 3.4 | 4.3 | 1.2 | 6.3 | 5.5 | 0.4 |
| Range for CH calculated by Eq. 1 | 5.5–0.65 | 5.2–0.60 | 5.3–0.61 | 5.2–0.6 | 5.2–0.6 | 5.3–0.63 |
| CR1 (mm) | 2000 | 1700 | 2200 | 1400 | 1500 | 3000 |
| Wear evenness | 150 | 130 | 120 | 100 | 105 | 110 |
| Cornering wear | 140 | 135 | 115 | 100 | 100 | 95 |
| Steering stability | 120 | 115 | 105 | 100 | 105 | 95 |
| Durability | 101 | 102 | 100 | 100 | 100 | 94 |

TABLE 2

| Tire | Ex. 1 | Ex. 2 | Ex. 3 | Ex. 4 | Ex. 5 | Ex. 6 | Ref. |
| --- | --- | --- | --- | --- | --- | --- | --- |
| Tire size | 185SR14 | 185/70R14 | 185/70R14 | 195/65R15 | 175/70R13 | 155SR12 | 195/70R14 |
| BW (mm) | 117 | 120 | 124 | 132 | 116 | 95 | 135 |
| SA (sq. mm) | 10.7 | 7.2 | 4.9 | 0 | 8.9 | 7.1 | 19.0 |
| SA/BW (×10−2 mm) | 9.1 | 6.0 | 4.0 | 0 | 7.7 | 7.5 | 14.1 |
| BBU (cm) | 33 | 24 | 0 | 0 | 14 | 0 | 117 |

We claim:
1. A belted radial ply tire comprising
a tread
a bead core disposed in each of a pair of bead portions,
a carcass extending between the pair of bead portions and turned up around each of the bead cores, and a belt comprising at least two cross plies disposed radially outside the carcass and inside the tread, in a normal state that the tire is mounted on its regular rim and inflated to its regular inner pressure but loaded with no tire load, a belt profile comprising a central part IP and a pair of lateral parts OP, wherein, said belt profile is defined by a thickness center curve L drawn radially equidistantly from the centers of the cords which compose each of two plies forming the effective belt part BE, the effective belt part BE being the part of the belt where the two widest plies overlap such that the cord directions of the respective plies cross each other, said central part IP extends between two points B, one located on each side of the tire equatorial plane and spaced apart a distance of 0.3 times the effective belt width BW from the tire equatorial plane, the effective belt width BW in millimeters being the maximum width of the effective belt part BE measured between the axially outermost edge points A thereof, said central part IP having a single radius CR1 of curvature being more than 1.4 times and not more than 15 times the tire section width TW in millimeters, each said lateral part OP extending axially outwardly from one of the points B to the adjacent outermost edge point A and having a curvature smoothly connected to the curvature of said central part IP, and the axially outer edge of each said lateral part OP cambered radially inwardly of the tire, so that said effective belt width BW, said tire section width TW and the belt edge camber height CH in millimeters defined as the radial distance between each of said points A and corresponding points B satisfy the following equation:

$$2.50(BW/TW)-1.25 < CH < 13.3(BW/TW)-4.65.$$

2. The tire according to claim 1, wherein the effective belt width BW, the belt edge camber height CH and the tire section width TW satisfy the following equation:

$$6.67(BW/TW)-3.33 < CH < 10.0(BW/TW)-3.0.$$

3. The tire according to claim 1, wherein said central part IP has a single radius CR1 of curvature being more than 1.4 times and not more than 10 times the tire section width TW.

4. The tire according to claim 1, wherein
each of said at least two cross plies includes parallel steel cords,
each said steel belt cord being composed of two or three strands twisted together,
each said strand being a steel monofilament,
the diameter of said steel monofilament being in the range of from 0.25 to 0.32 mm,
the twisting pitches of the strands being 8 to 15 mm,
the cord count of the steel cords in each belt ply being 39 to 60 ends/5 cm,
the quotient SA/BW of the belt edge camber area SA divided by the effective belt width BW being in the range from greater than 0 to 0.1, the belt edge camber area SA in square millimeters being defined in each belt edge as surrounded by the lateral part OP, a radial line extending radially outwardly from the outermost edge point A thereof, and an extension of said central part IP intersecting the radial line.

5. The tire according to claim 2, wherein said central part IP has a single radius CR1 of curvature being more than 1.4 times and not more than 10 times the tire section width TW.

6. The tire according to claim 2, wherein
each of said at least two cross plies includes parallel steel cords,
each said steel belt cord being composed of two or three strands twisted together,
each said strand being a steel monofilament,
the diameter of said steel monofilament being in the range of from 0.25 to 0.32 mm,
the twisting pitches of the strands being 8 to 15 mm,
the cord count of the steel cords in each belt ply being 39 to 60 ends/5 cm,
the quotient SA/BW of the belt edge camber area SA divided by said effective belt width BW being in the range from greater than 0 to 0.1, the belt edge camber area SA in square millimeters being defined in each belt edge as surrounded by the lateral part OP, a radial line extending radially outwardly from the outermost edge point A thereof, and an extension of said central part IP.

7. A belted radial ply tire comprising
a tread,
a bead core disposed in each of a pair of bead portions,
a carcass extending between the pair of bead portions and turned up around each of the bead cores, and
a belt comprising at least two cross plies disposed radially outside the carcass and inside the tread,
in a state that the tire is mounted on its regular rim and inflated to its regular inner pressure but loaded with no tire load,
the effective belt width BW in millimeters of the effective belt part BE of the belt,
the belt edge camber height CH in millimeters of the belt, and
the tire section width TW in millimeters
satisfying the following equation:

$$2.50(BW/TW)-1.25 < CH < 13.3(BW/TW)-4.65$$

wherein
the effective belt width BW is the maximum width of the effective belt part BE measured between the axially outermost edge points A thereof,
the effective belt part BE is the part of the belt where the two widest belt plies overlap such that the cord directions of the respective plies cross each other, and
the belt edge camber height CH is the radial distance between each of the outermost edge points A of the effective belt part BE and two corresponding points B one of which is located axially inward of each of the outermost edge points A by an axial distance of 0.2 times the effective belt width BW.

8. The tire according to claim 7, wherein said belt is provided with a profile thickness center curve L such that a first arc passing through three points B, C and B on the thickness center curve L has its center on the equatorial plane of the tire and a curvature radius CR1, the radius CR1 of the first arc being more than 1.4 times the tire section width TW, wherein the thickness center curve L is a curve drawn radially equidistantly from the centers of the cords which compose each of the two plies forming the effective belt part BE, each of points B is spaced apart a distance of 0.3 BW from the tire equatorial plane, and point C is a point of intersection between the tire equatorial plane and the thickness center curve L.

9. The tire according to claim 8 wherein, said at least two cross plies include parallel steel cords, each said steel belt cord being composed of two or three strands twisted together, each strand being a steel monofilament, the diameter of said steel monofilament being in a range from 0.25 to 0.32 mm, the twisting pitches of the strands being 8 to 15 mm, the cord count of the steel cords in each belt ply being 39 to 60 ends/5 cm, and wherein the first arc defines a central part, and the thickness center curve L further includes a pair of lateral parts, each of the lateral parts extending axially outward from one of the points B to the adjacent outermost edge point A and being defined by a curve, the radius of curvature of the curve being smaller than the radius CR1, the quotient SA/BW of the belt edge camber area SA divided by the effective belt width BW being in the range from greater than 0 to less than 0.1, and the belt edge camber area SA in square millimeters is defined on each side of the equatorial plane by the center curve L, a radial line extending from the corresponding outermost edge point A to a point D, the point D being the intersection of the radial line and an extension of the first arc past the corresponding point B.

10. The tire according to claim 8, wherein the effective belt width BW, the belt edge camber height CH and the tire section width TW satisfy the following equation:

$$6.67(BW/TW) - 3.33 < CH < 10.0(BW/TW) - 3.0.$$

11. The tire according to claim 10, wherein the radius CR1 of the first arc is more than 1.4 times and not more than 15 times the tire section width TW.

12. The tire according to claim 11, wherein the radius CR1 of the first arc is more than 1.4 times and not more than 10 times the tire section width TW.

* * * * *